(12) United States Patent
Brown (10) Patent No.: US 8,585,226 B2
(45) Date of Patent: Nov. 19, 2013

(54) SYSTEMS AND METHODS FOR BALANCING MIRRORS IN LIMITED ROTATION MOTOR SYSTEMS

(75) Inventor: David C. Brown, Northborough, MA (US)

(73) Assignee: Cambridge Technology, Inc., Bedford, MA (US)

( * ) Notice: Subject to any disclaimer, the term of this patent is extended or adjusted under 35 U.S.C. 154(b) by 90 days.

(21) Appl. No.: 13/253,194

(22) Filed: Oct. 5, 2011

(65) Prior Publication Data

US 2013/0027761 A1    Jan. 31, 2013

Related U.S. Application Data

(60) Provisional application No. 61/513,248, filed on Jul. 29, 2011.

(51) Int. Cl.
*G02B 7/182* (2006.01)

(52) U.S. Cl.
USPC .......................................................... 359/871

(58) Field of Classification Search
USPC ......................................... 359/871, 872, 877
See application file for complete search history.

(56) References Cited

U.S. PATENT DOCUMENTS

| | | | |
|---|---|---|---|
| 3,772,464 A | 11/1973 | Chan et al. | |
| 3,897,139 A | 7/1975 | Caruolo et al. | |
| 4,060,315 A | 11/1977 | Heinz | |
| 4,147,401 A | 4/1979 | Reichl et al. | |
| 4,756,586 A | 7/1988 | Witteveen | |
| 4,902,083 A | 2/1990 | Wells | |
| 5,543,954 A | 8/1996 | Nicholson | |
| 6,377,601 B1 | 4/2002 | Aoki | |
| 6,972,885 B2 | 12/2005 | Hiley et al. | |
| 7,009,752 B1 | 3/2006 | Lorell et al. | |
| 7,316,356 B2 | 1/2008 | Minter et al. | |
| 7,463,828 B2 | 12/2008 | Moon et al. | |
| 7,471,432 B2 | 12/2008 | Pruyn | |
| 7,738,153 B2 * | 6/2010 | Harris et al. | ............. 359/212.1 |
| 2004/0238639 A1 | 12/2004 | Dvorkis | |
| 2005/0046979 A1 | 3/2005 | Hiley et al. | |

OTHER PUBLICATIONS

International Search Report and Written Opinion mailed on Jan. 17, 2013 in connection with International Patent Application No. PCT/US2012/047590 filed on Jul. 20, 2012, 8 pages.

* cited by examiner

*Primary Examiner* — Euncha Cherry
(74) *Attorney, Agent, or Firm* — Gesmer Updegrove LLP (57) ABSTRACT

A method of balancing a mirror in a limited rotation motor system is disclosed. The method includes the steps of providing a mirror on a rotor shaft of the limited rotation motor system such that the mirror is initially imbalanced in that the mirror is slightly more weighted to lean to a front side of the mirror that includes a front reflective face of the mirror, and adjusting at least one threaded counterweight screw on a back side of the mirror at least to a position at which the mirror becomes balanced between the front and back sides.

20 Claims, 7 Drawing Sheets

SYSTEMS AND METHODS FOR BALANCING MIRRORS IN LIMITED ROTATION MOTOR SYSTEMS

PRIORITY

The present application claims priority to U.S. Provisional Patent Application Ser. No. 61/513,248 filed Jul. 29, 2011, which is hereby incorporated by reference in its entirety.

BACKGROUND

The present invention generally relates to vibration reduction systems in scanning mirror systems, and relates in particular to reducing vibration and imbalance in scanning mirror systems including limited rotation motors that are used for scanning laser beams over a limited angular range.

Scanning mirror systems include continuously rotating motor systems and limited rotation motor systems. Continuously rotating motor systems for example, may include a rotating polygonal mirror that rotates continuously, and limited rotation motor systems rotate a rotor reciprocally over a limited rotational angular range.

Balancing systems in certain prior art scanning mirror systems involve, in part, correcting for unavoidable imbalances that are caused by parts of the scanning system itself. For example, U.S. Pat. No. 7,316,356 discloses the use of tungsten counterweights for balancing mirrors, wherein the counterweights are disclosed to account for imbalance caused by a precessional torque that is created by rotating a spinner about two axes. The counterweights are not adjustable. U.S. Pat. No. 4,756,586 discloses the use of set screws for adjusting the plane of rotation of a polygonal mirror so that it may be perpendicular to the drive shaft, and further discloses the use of balance screws that are provided to correct an imbalance caused by the set screws. Neither reference discloses finely balancing a mirror mounted on a shaft to account for imperfections in manufacturing.

In typical limited rotation scanner systems, a mirror is mounted to the output shaft of a limited rotation motor (e.g., galvanometer) and the limited rotation motor is controlled by a control loop that seeks to cause the rotor of the motor, and therefore the mirror, to follow a position and velocity command waveform with arbitrarily high fidelity. There are limits, however, on the fidelity with which the system may follow the command.

For example, the acceleration of the mirror within the system is limited by the rate of rise of current in the motor windings. The positional precision is limited by the signal to noise ratio of the feedback method. The bandwidth of the system (which is its ability to move from position A to position B at a desired high velocity and to then settle at position B precisely in the shortest possible time), is limited primarily by vibrations in the moving parts. The bandwidth of the system will nominally be the first torsional resonance in the moving structure. The mirrors therefore, must rotate on the motor shaft back and forth between two angular positions very quickly yet remain very rigid. Not only does this require that the mirrors be made of rigid materials, but their weight must remain low enough that the inertia required to move the mirror from a stop position is not too high.

It is customary, therefore, to make the moving parts as stiff and well balanced as possible within the constraints of the allowable system inertia. Since the torque required of the motor to reach a specified acceleration is directly proportional to the inertia and is proportional to the current (whose rate of rise is limited as noted above), it is often the case that when the system parameters are optimized for a particular inertia, some component, typically the mirror is not as stiff and/or balanced as is required to reach system bandwidth goals, even when made of a very high stiffness-to-inertia material.

Such mirrors for limited rotation motors must therefore be balanced (both front-to-back and side-to-side) so that they introduce as little wobble as possible when moving. In certain applications, extra material is added to the back of the mirror to increase its stiffness and/or balancing, but at the cost of additional inertia, requiring a larger, more expensive motor as well as a control loop that is capable of driving the additional inertia. In some applications for example, such balancing has been done in the industry by adhering small amounts of epoxy onto the back side of the mirror to affect such balancing. Such a procedure however, is not fully satisfactory in all applications such as large-scale manufacturing applications.

Other techniques for balancing mirrors (side-to-side) include the use of trim weights in the form of opposing set screws that are received in opposing bores of a mirror such that any imbalance of the mirror in a plane that includes the cores of the set screws, may be corrected by adjustment of one or both set screws as disclosed in U.S. Pat. No. 6,972,885. The set screws are disclosed to be received in bores in the outer back side and lateral sides of the mirror, but may be difficult to use to achieve a perfect balance when the mirror alone is very closely balanced. Moreover, the use of the set screws as disclosed in U.S. Pat. No. 6,972,885 does not achieve front-to-back balancing, and the set screws add weight (increasing inertia) and may migrate during movement of the mirror.

There is a need therefore, for a limited rotation motor system that provides improved bandwidth without requiring a larger, more expensive motor and accompanying control system, and in particular, there is a need for providing improved mirror balancing without adversely affecting mirror inertia.

SUMMARY

In accordance with an embodiment, the invention provides a method of balancing a mirror in a limited rotation motor system. The method includes the steps of providing a mirror on a rotor shaft of the limited rotation motor system such that the mirror is initially imbalanced in that the mirror is slightly more weighted to lean to a front side of the mirror that includes a front reflective face of the mirror, and adjusting at least one threaded counterweight screw on a back side of the mirror at least to a position at which the mirror becomes balanced between the front and back sides.

In accordance with another embodiment, the method includes the steps of providing a mirror on a rotor shaft of the limited rotation motor system, and adjusting mutually opposing threaded counterweight screws that capture a high density element between the mutually opposing threaded counterweight screws, to thereby urge the high density element away from a central position within the mirror toward one side of the mirror in a direction that is generally transverse to a front side to back side direction of the mirror.

In accordance with a further embodiment, the invention provides a mirror for use in a limited rotation motor system, wherein the mirror includes at least one threaded counterweight screw on a back side of the mirror that is adjustable from a forward position in which the mirror is imbalanced in that the mirror is slightly more weighted to lean to a front side of the mirror that includes a front reflective face of the mirror, to a position at which the mirror becomes balanced between the front and back sides.

In accordance with a further embodiment, the mirror includes a front reflective side, a back side, and an axis of rotation, wherein the back side includes at least two threaded counterweight screws, each of which is directed toward the axis of rotation.

In accordance with a further embodiment, a mirror of the invention includes mutually opposing threaded counterweight screws that capture a high density element between the mutually opposing threaded counterweight screws, wherein said mutually opposing threaded counterweight screws are adjustable to urge the high density element away from a central position within the mirror toward one side of the mirror in a direction that is generally transverse to a front side to back side direction of the mirror.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment, the invention involves first providing that a mirror for a limited rotation motor is slightly biased to lean in the direction of the front face of the mirror. For front-to-back balancing, one or more threaded counterweight screws are placed in the back of the mirror. When the counterweight screws are turned all the way into the mirror (toward the front face), the mirror remains biased toward the front, but as the one or more counterweight screws are turned out of the mirror, a front-to-back balance point is obtained.

The side-to-side balancing is done using a pair of opposing threaded counterweight screws that capture a tungsten ball between them. The tungsten ball is initially positioned along the center line of rotation of the mirror to minimize increased inertia. After the counterweight screws are adjusted to the respective balance points, epoxy is applied to each screw to secure each in place so that each counterweight screw remains stationary during movement of the mirror during use in a limited rotation scanning system.

Figure 1:
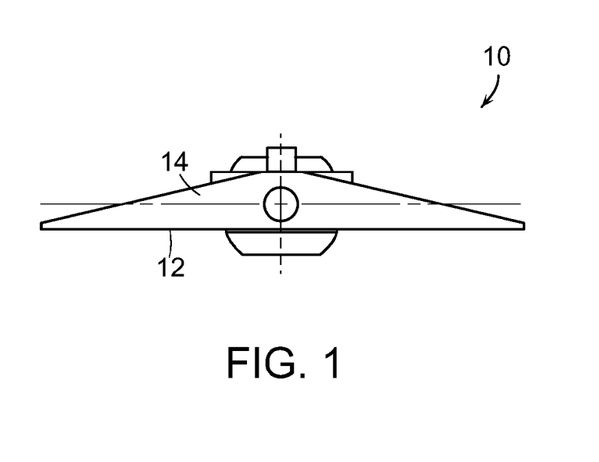
FIG. 1 shows an illustrative diagrammatic top view of a mirror in accordance with an embodiment of the invention.
Figure 2:
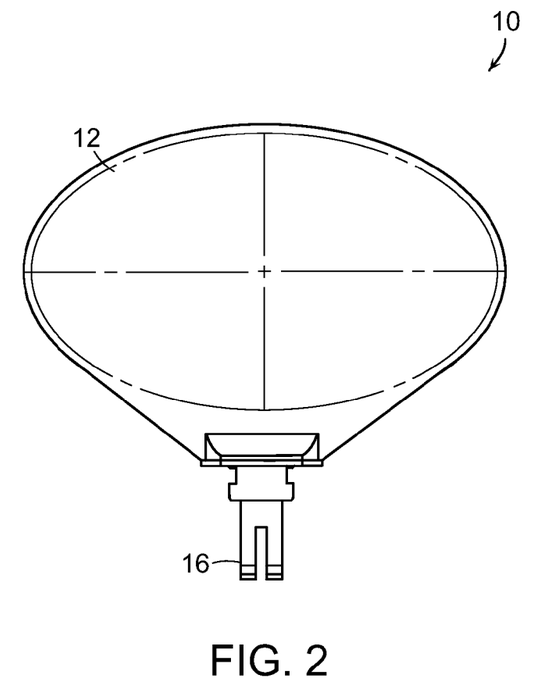
FIG. 2 shows an illustrative diagrammatic front view of the mirror of FIG. 1.
Figure 3:
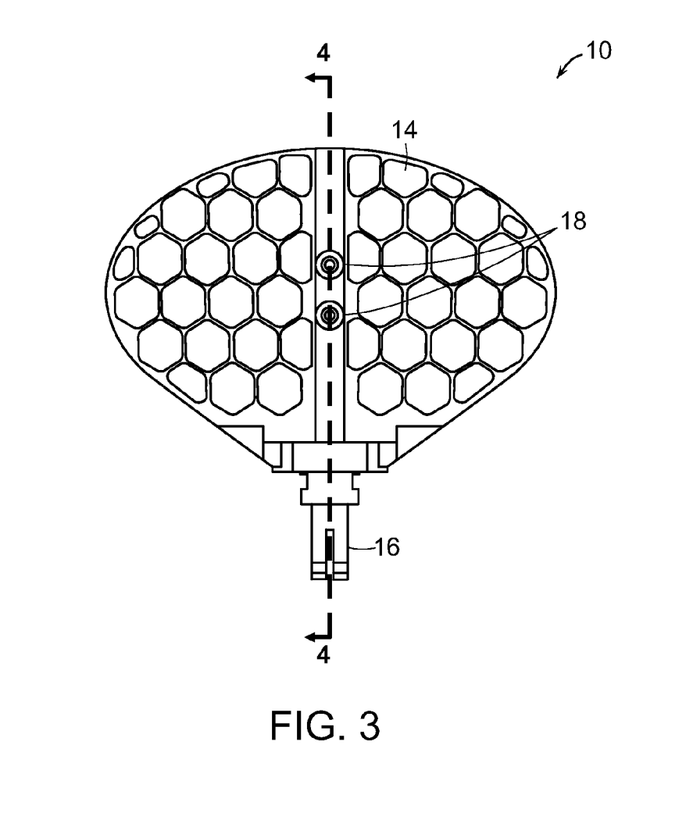
FIG. 3 shows an illustrative diagrammatic back view of the mirror of FIG. 1.
Figure 4:
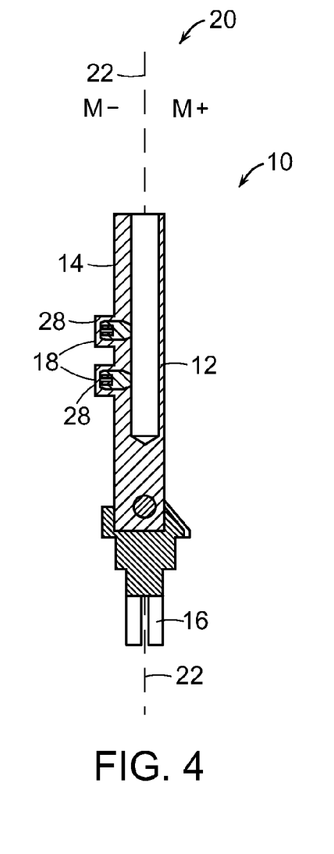
FIG. 4 shows an illustrative diagrammatic side sectional view of the mirror of FIG. 3 taken along line 4-4 thereof.
Figure 5:
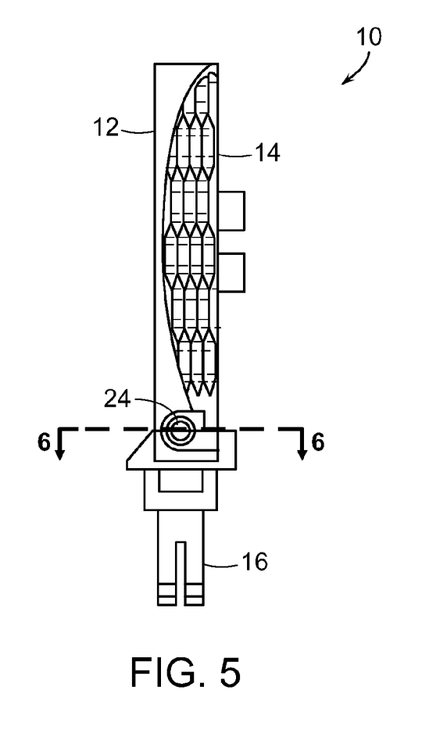
FIG. 5 shows an illustrative diagrammatic side view of the mirror of FIG. 1.
Figure 6:
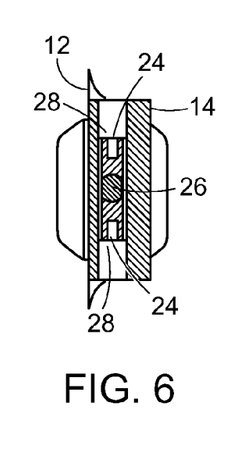
FIG. 6 shows an illustrative diagrammatic sectional view of the mirror of FIG. 5 taken along line 6-6 thereof.

FIGS. 1-6 for example, show an embodiment of the invention that includes a mirror 10 having a front side 12 that provides a highly reflective surface, a back side 14, and mounting structure 16 for coupling the mirror to a rotor shaft in a limited rotation motor system (either directly or via a coupling member). As shown in FIGS. 3 and 4, the back side 14 of the mirror includes one or two threaded counterweight screws 18 that are received within threaded openings in the back side of the mirror. As shown in FIG. 4, the back side may be shaped to remove material (e.g., providing a honeycomb pattern as shown) to reduce weight of the mirror while maintaining rigidity.

As shown diagrammatically at 20 of FIG. 4, the mirror is designed to have slightly more mass $M_+$ on the front side of the mirror with respect to its axis of rotation 22 than the mass M− of the back side with respect to the axis of rotation 22. The result of this, is that when the mirror is initially mounted onto a rotor shaft, the mirror will be imbalanced in a way that it seeks to lean toward the front side of the mirror. The threaded counterweight screws 18 are initially threaded into their respective openings so that they are positioned nearest the front side of the mirror. During balancing of the front to back sides, the threaded counterweight screws 18 are turned (unscrewed) such that they move in a direction away from the front side of the mirror. Where two such counterweight screws 18 are used, one may provide coarse adjustment (e.g., the one further from the mounting structure 16), while the other provides finer adjustment. In further embodiments, one counterweight screw may have a finer thread pitch than the other counterweight screw. The range of movement is designed to provide that a balance point between the front and back sides is achieved during this adjustment. In certain alternative embodiments, the screws may be adjusted from the furthest unscrewed position forward until a balance point is achieved.

The mirror 10 also includes mutually opposing counterweight screws 24 that capture a high density element 26 between the mutually opposing threaded counterweight screws 24. The high density element may, for example, be a sphere formed of tungsten. The counterweight screws 24 are adjustable to urge the high density element 26 away from a central position within the mirror (e.g., centered along the axis of rotation of the mirror) toward one side of the mirror in a direction that is generally transverse to a front side to back side direction of the mirror. This adjustment provides side-to-side (left to right as shown in FIG. 2) balancing of the mirror.

Following adjustment of the counterweight screws discussed above, a small amount of adhesive 28 such as epoxy may be applied to the exposed portions of each of the counterweight screws to secure them in place during use of the mirror in a limited rotation motor system. Preferably, the weight contributed by the epoxy is negligible. If not, each counterweight screw may be adjusted a very small amount inwardly prior to the application of epoxy to accommodate the weight of the epoxy.

Figure 7:
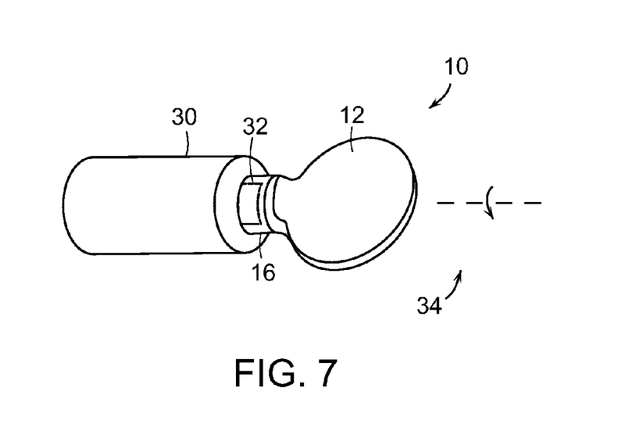
FIGS. 7 and 8 show illustrative diagrammatic views of balance assessment systems for use in accordance with various embodiments of the invention.

Assessment of whether a mounted mirror is balanced may be achieved in a variety of ways. In certain systems having very low friction bearings, the drive coils within a motor 30 may be removed, and the rotor may be mounted within the motor's bearings. The mirror 10 is coupled to a mirror mounting unit 16, which in turn is coupled to a rotor shaft 32 of the motor 30. As shown at 34, when the motor is positioned such that the axis of rotation of the rotor shaft 32 is generally parallel with flat ground, the heavier side (front or back) of the mirror will face downward. Similarly, if one lateral side of the mirror includes more mass ($M_+$) than the other side ($M-$), the side with the more mass will face downward. If both sets of counterweight screws need adjustment, the mirror will be at an angle with respect to flat ground. The counterweight screws may be adjusted as discussed above until the mirror exhibits no favored rotational position on the rotor shaft when permitted to rotate (or not) freely on its own.

Figure 8:
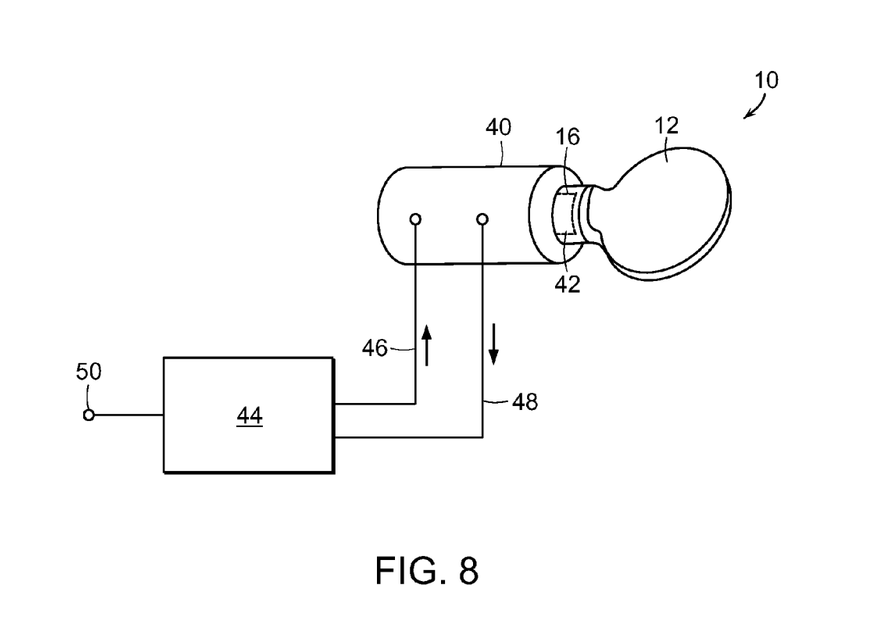

With reference to FIG. 8, assessment of mounted mirror balance may also be performed using a motor 40 that includes bearings that are mounted on pressure sensitive v-blocks. The motor is driven, for example, by applying a drive signal as shown at 46 (or by applying a drive belt to an exposed portion of the rotor with the drive coils removed). Sensors coupled to the v-blocks within the motor will output signals 50 indicative of the amount of vibration and therefore imbalance in the system. The counterweights may then be adjusted and then retested until the output signals 50 are minimized. In certain embodiments, the processor 44 may even provide information regarding which counterweight screws need to be adjusted.

Figure 9:
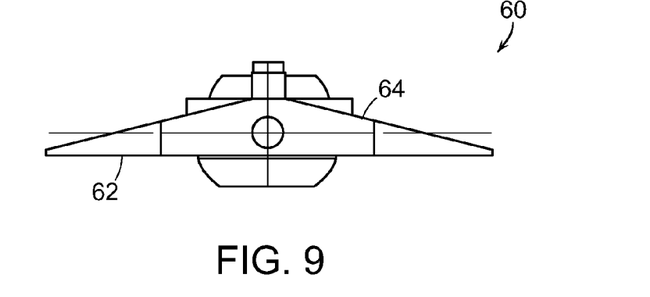
FIG. 9 shows an illustrative diagrammatic top view of a mirror in accordance with another embodiment of the invention.
Figure 10:
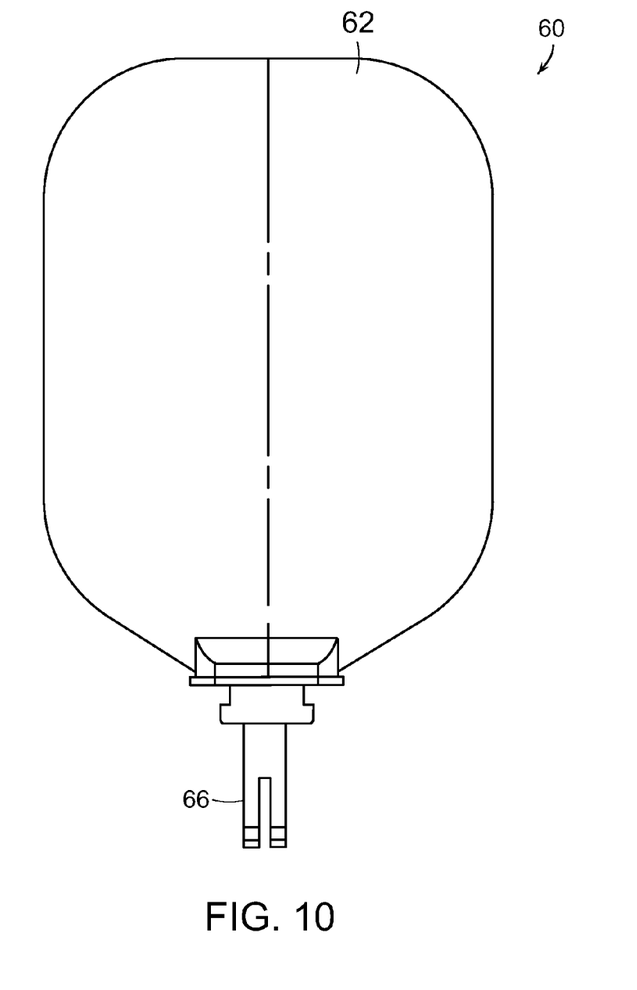
FIG. 10 shows an illustrative diagrammatic front view of the mirror of FIG. 9.
Figure 11:
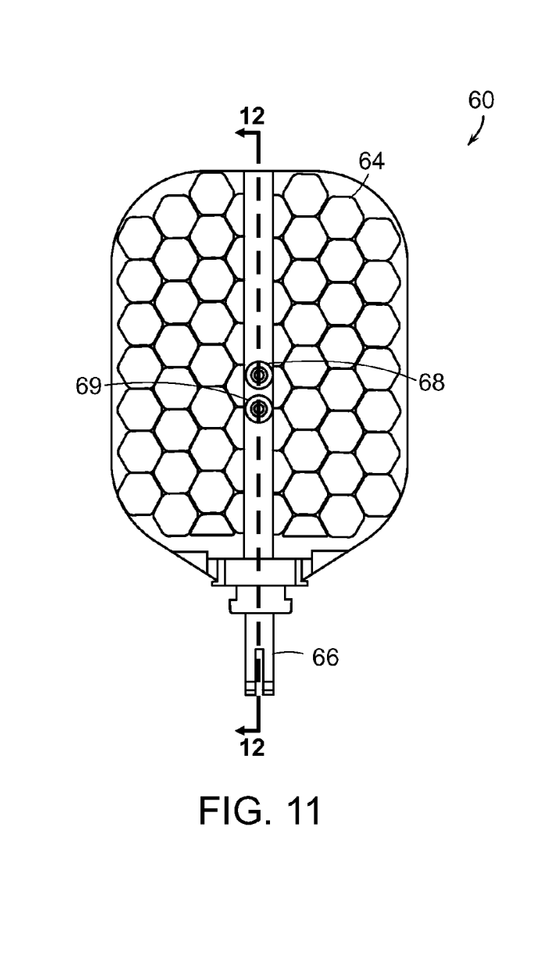
FIG. 11 shows an illustrative diagrammatic back view of the mirror of FIG. 9.
Figure 12:
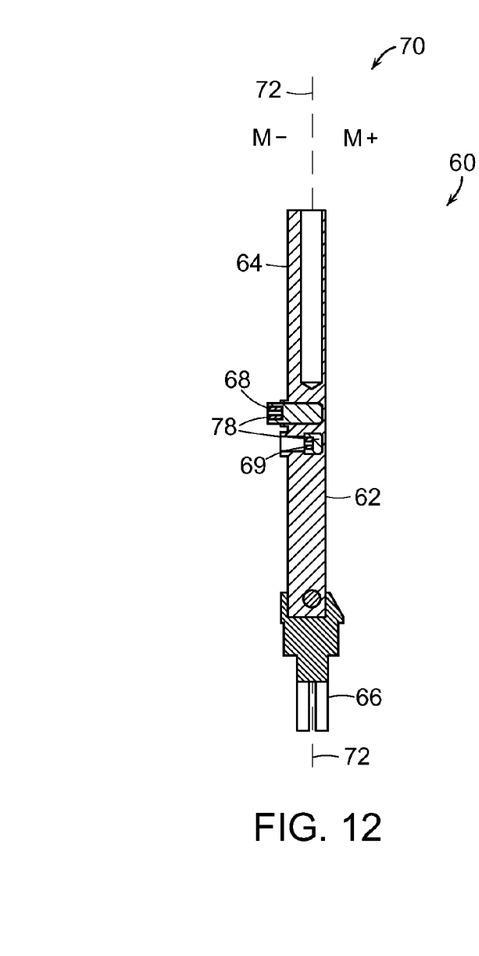
FIG. 12 shows an illustrative diagrammatic side sectional view of the mirror of FIG. 11 taken along line 11-11 thereof.
Figure 13:
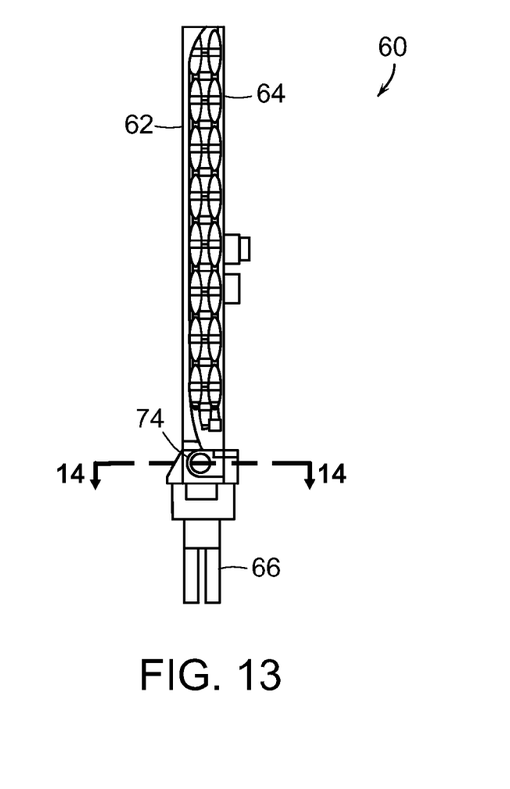
FIG. 13 shows an illustrative diagrammatic side view of the mirror of FIG. 9.
Figure 14:
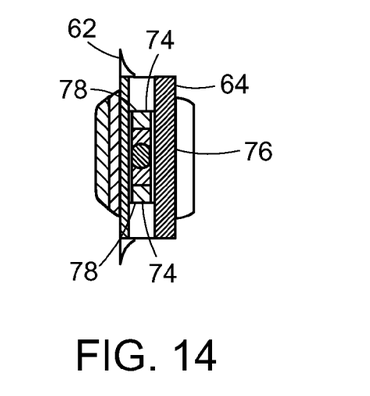
FIG. 14 shows an illustrative diagrammatic sectional view of the mirror of FIG. 13 taken along line 14-14 thereof.

As shown in FIGS. 9-14, a mirror 60 in accordance with another embodiment of the invention may include a front side 62 that provides a highly reflective surface, a back side 64, and mounting structure 66 for coupling the mirror to a rotor shaft in a limited rotation motor system. As shown in FIGS. 9 and 10, the back side 64 of the mirror includes two threaded counterweight screws 68, 69 that are received within threaded openings in the back side of the mirror.

As shown diagrammatically at 70 of FIG. 10, the mirror is designed to have slightly more mass $M_+$ on the front side of the mirror with respect to its axis of rotation 72 than the mass $M_-$ of the back side with respect to the axis of rotation 72. The result of this, is that when the mirror is initially mounted onto a rotor shaft, the mirror will be imbalanced in a way that it seeks to lean toward the front side of the mirror. The threaded counterweight screws 68, 69 are initially threaded into their respective openings so that they are as positioned nearest the front side of the mirror. During front-to-back balancing, the threaded counterweight screws 68, 69 are turned (unscrewed) such that they move in a direction away from the front side of the mirror. Again, the counterweight screws 68, 69 may provide coarse adjustment using the one that is further from the mounting structure 66, while the other provides finer adjustment. Further, as show, the coarse adjustment counterweight screw 68 may be larger than the fine adjustment counterweight screw 69. Again, in further embodiments, one counterweight screw may have a finer thread pitch than the other counterweight screw. The range of movement is designed to provide that a balance point between the front and back sides is achieved during this adjustment. In certain alternative embodiments, the screws may be adjusted from the furthest unscrewed position forward until a balance point is achieved.

The mirror 70 also includes mutually opposing counterweight screws 74 that capture a high density element 76 between the mutually opposing threaded counterweight screws 74. The high density element may, for example, be a sphere formed of tungsten. The counterweight screws 74 are adjustable to urge the high density element 76 away from a central position within the mirror (e.g., centered along the axis of rotation of the mirror) toward one side of the mirror in a direction that is generally transverse to a front side to back side direction of the mirror. This adjustment provides side to side (left to right) balancing of the mirror.

Again, following adjustment of the counterweight screws discussed above, a small amount of adhesive 78 such as epoxy may be applied to the exposed portions of each of the counterweight screws to secure them in place during use of the mirror in a limited rotation motor system. Again, the weight contributed by the epoxy is preferably negligible. If not, each counterweight screw may be adjusted a very small amount inwardly prior to the application of epoxy to accommodate the weight of the epoxy.

Those skilled in the art will appreciate that numerous modifications and variations may be made to the above disclosed embodiments without departing from the spirit and scope of the present invention.

What is claimed is:

1. A method of balancing a mirror in a limited rotation motor system, said method comprising the steps of:
    providing a mirror on a rotor shaft of the limited rotation motor system such that the mirror is initially imbalanced in that the mirror is slightly more weighted to lean to a front side of the mirror that includes a front reflective face of the mirror; and
    adjusting at least one threaded counterweight screw on a back side of the mirror at least to a position at which the mirror becomes balanced between the front and back sides.

2. The method as claimed in claim 1, wherein said method further includes the step of adjusting mutually opposing threaded counterweight screws that capture a high density element between the mutually opposing threaded counterweight screws, to thereby urge the high density element away from a central position within the mirror toward one side of the mirror in a direction that is generally transverse to a front side to back side direction of the mirror.

3. The method as claimed in claim 2, wherein said high density element is spherical in shape.

4. The method as claimed in claim 1, wherein said method further includes the step of applying an adhesive to an exposed portion of each threaded counterweight screw.

5. A method of balancing a mirror in a limited rotation motor system, said method comprising the steps of:
    providing a mirror on a rotor shaft of the limited rotation motor system; and
    adjusting mutually opposing threaded counterweight screws that capture a high density element between the mutually opposing threaded counterweight screws, to thereby urge the high density element away from a central position within the mirror toward one side of the mirror in a direction that is generally transverse to a front side to back side direction of the mirror.

6. The method as claimed in claim 5, wherein said mirror is provided on the rotor shaft such that the mirror is initially imbalanced in that the mirror is slightly more weighted to lean to a front side of the mirror that includes a front reflective face of the mirror, and wherein said method further includes the step of adjusting at least one threaded counterweight screw on a back side of the mirror at least to a position at which the mirror becomes balanced between the front and back sides.

7. The method as claimed in claim 5, wherein said high density element includes tungsten.

8. The method as claimed in claim 5, wherein said high density element is spherical in shape.

9. The method as claimed in claim 5, wherein said method further includes the step of applying an adhesive to an exposed portion of each threaded counterweight screw.

10. A mirror for use in a limited rotation motor system, said mirror comprising at least one threaded counterweight screw on a back side of the mirror that is adjustable from a forward position in which the mirror is imbalanced in that the mirror is slightly more weighted to lean to a front side of the mirror that includes a front reflective face of the mirror, to a position at which the mirror becomes balanced between the front and back sides.

11. The minor as claimed in claim 10, wherein said mirror further includes mutually opposing threaded counterweight screws that capture a high density element between the mutually opposing threaded counterweight screws, wherein said mutually opposing threaded counterweight screws are adjustable to urge the high density element away from a central position within the mirror toward one side of the mirror in a direction that is generally transverse to a front side to back side direction of the mirror.

12. The mirror as claimed in claim 11, wherein said high density element includes tungsten.

13. The mirror as claimed in claim 11, wherein said high density element is spherical in shape.

14. The mirror as claimed in claim 10, wherein said mirror includes an adhesive on an exposed portion of each threaded counterweight screw.

15. A mirror for use in a limited rotation motor system, said mirror comprising a front reflective side, a back side, and an axis of rotation, said back side including at least two threaded counterweight screws, each of which is directed toward the axis of rotation.

16. A mirror for use in a limited rotation motor system, said mirror comprising mutually opposing threaded counterweight screws that capture a high density element between the mutually opposing threaded counterweight screws, wherein said mutually opposing threaded counterweight screws are adjustable to urge the high density element away from a central position within the mirror toward one side of the mirror in a direction that is generally transverse to a front side to back side direction of the mirror.

17. The mirror as claimed in claim 16, wherein said mirror further includes at least one threaded counterweight screw on a back side of the mirror that is adjustable from a forward position in which the mirror is imbalanced in that the mirror is slightly more weighted to lean to a front side of the mirror that includes a front reflective face of the mirror, to a position at which the mirror becomes balanced between the front and back sides.

18. The mirror as claimed in claim 16, wherein said high density element includes tungsten.

19. The mirror as claimed in claim 16, wherein said high density element is spherical in shape.

20. The mirror as claimed in claim 16, wherein said mirror includes an adhesive on an exposed portion of each threaded counterweight screw.

* * * * *

UNITED STATES PATENT AND TRADEMARK OFFICE
CERTIFICATE OF CORRECTION

| | | |
|---|---|---|
| PATENT NO. | : 8,585,226 B2 | Page 1 of 1 |
| APPLICATION NO. | : 13/253194 | |
| DATED | : November 19, 2013 | |
| INVENTOR(S) | : David C. Brown | |

It is certified that error appears in the above-identified patent and that said Letters Patent is hereby corrected as shown below:

In the Claims:

In Column 7, line 4 of the issued Patent, please delete "minor" and replace with --mirror--.

Signed and Sealed this
Eleventh Day of February, 2014

Michelle K. Lee
*Deputy Director of the United States Patent and Trademark Office*